United States Patent
Fang et al.

(10) Patent No.: US 9,002,163 B2
(45) Date of Patent: Apr. 7, 2015

(54) OPTICAL CONVERTER AND METHOD OF MANUFACTURING THE SAME

(75) Inventors: Qing Fang, Singapore (SG);
Tsung-Yang Liow, Singapore (SG);
Mingbin Yu, Singapore (SG); Guo Qiang Patrick Lo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 184 days.

(21) Appl. No.: 13/517,377

(22) PCT Filed: Dec. 23, 2009

(86) PCT No.: PCT/SG2009/000492
§ 371 (c)(1),
(2), (4) Date: Sep. 12, 2012

(87) PCT Pub. No.: WO2011/078789
PCT Pub. Date: Jun. 30, 2011

(65) Prior Publication Data
US 2012/0328243 A1 Dec. 27, 2012

(51) Int. Cl.
*G02B 6/26* (2006.01)
*G02B 6/30* (2006.01)
(Continued)

(52) U.S. Cl.
CPC .............. *G02B 6/305* (2013.01); *G02B 6/1228* (2013.01); *G02B 6/136* (2013.01)

(58) Field of Classification Search
CPC ........ G02B 6/12007; G02B 6/30; G02B 6/43; G02B 6/125; G02B 6/1228
USPC ............. 385/14, 27, 28, 43, 131, 132, 15, 39, 385/50, 129, 130
See application file for complete search history.

(56) References Cited

U.S. PATENT DOCUMENTS

| 6,108,478 A | 8/2000 | Harpin et al. |
| 6,112,002 A * | 8/2000 | Tabuchi ........................ 385/50 |

(Continued)

FOREIGN PATENT DOCUMENTS

| WO | WO03005084 A1 | 1/2003 |
| WO | WO2009106140 A1 | 9/2009 |

OTHER PUBLICATIONS

Muller, MEMS on Silicon for Integrated Optic Metrology and Communication Systems, 9 Microsystem Technologies 308 (2003).

(Continued)

*Primary Examiner* — Jennifer Doan
(74) *Attorney, Agent, or Firm* — K. David Crockett, Esq.; Niky Economy Syrengelas, Esq.; Crockett & Crockett, PC

(57) ABSTRACT

An optical converter and a method of manufacturing the optical converter are provided. The optical converter may include a signal receiving portion configured to receive an optical signal from an optical fiber which can be coupled to the optical converter, a signal output portion configured to output the optical signal received by the signal receiving portion, and a signal coupling portion being disposed between the signal receiving portion and the signal output portion and being configured to couple the optical signal received by the signal receiving portion into the signal output portion. The signal output portion may include a waveguide element having at least one tapered end section, and being partially or wholly surrounded by the signal coupling portion. The at least one tapered end section may be configured to couple the optical signal from the signal coupling portion into the waveguide element and the waveguide element may be configured to output the optical signal.

21 Claims, 15 Drawing Sheets

(51) Int. Cl.
*G02B 6/122* (2006.01)
*G02B 6/136* (2006.01)

(56) References Cited

U.S. PATENT DOCUMENTS

| | | | |
|---|---|---|---|
| 6,253,009 B1* | 6/2001 | Lestra et al. | 385/50 |
| 6,396,984 B1* | 5/2002 | Cho et al. | 385/43 |
| 6,415,066 B1 | 7/2002 | Harpin et al. | |
| 7,359,593 B2* | 4/2008 | Little | 385/30 |
| 7,643,710 B1* | 1/2010 | Liu | 385/43 |
| 2003/0012493 A1 | 1/2003 | Lee et al. | |
| 2003/0169970 A1* | 9/2003 | Bazylenko et al. | 385/50 |
| 2004/0017976 A1 | 1/2004 | Luo et al. | |
| 2004/0057667 A1* | 3/2004 | Yamada et al. | 385/43 |
| 2004/0121520 A1* | 6/2004 | Karkkainen | 438/107 |
| 2005/0123244 A1* | 6/2005 | Block et al. | 385/43 |
| 2006/0062521 A1* | 3/2006 | Zhou et al. | 385/43 |
| 2006/0115215 A1 | 6/2006 | Liu | |
| 2009/0087144 A1* | 4/2009 | Yoshida | 385/43 |
| 2009/0252456 A1* | 10/2009 | Rasras | 385/43 |
| 2009/0297093 A1 | 12/2009 | Webster et al. | |
| 2011/0205660 A1* | 8/2011 | Komura et al. | 360/59 |
| 2012/0076465 A1* | 3/2012 | Chen et al. | 385/124 |
| 2012/0141069 A1* | 6/2012 | Ming-Chang et al. | 385/43 |
| 2012/0294566 A1* | 11/2012 | Ho et al. | 385/14 |

OTHER PUBLICATIONS

Moerman, et al., A Review on Fabrication Technologies for the Monolithic Integration of Tapers with III-V Semiconductor Devices, 3 IEEE Journal of Selected Topics in Quantum Electrornics 1308 (IEEE 1997).

* cited by examiner

OPTICAL CONVERTER AND METHOD OF MANUFACTURING THE SAME

TECHNICAL FIELD

Various embodiments relate generally to an optical converter and a method of manufacturing the optical converter.

BACKGROUND

Silicon photonics devices based on Silicon-on-Insulation (SOI) have been widely developed. A silicon photonics device typically has a waveguide which is coupled to an optical fiber so that an optical signal from the optical fiber can be coupled into the waveguide. The waveguide of the silicon photonics device generally has very small dimensions, e.g. only several hundred nanometers (i.e. a small mode size). On the other hand, an optical fiber e.g. a single mode fiber generally has a large diameter (i.e. a large mode size). Thus, there is usually a mismatch between the mode size of the waveguide and the mode size of the single mode fiber when the waveguide is directly coupled with the single mode fiber. Therefore, the coupling loss may be very high if the nanoscale silicon waveguide directly couples with the single mode fiber. In addition, the alignment tolerance may be very small. Therefore, it may be difficult to package silicon photonics devices with single mode fibers.

In view of the above-mentioned problems, a low loss optical converter for the silicon photonic devices was developed to couple the waveguide and the optical fiber. In this low loss optical converter, a silicon nano-scale tip is covered with a low refractive index silicon dioxide layer. The optical converter may have a coupling loss of about 2.0-3.0 dB when it is coupled with a tapered fiber. However, the optical converter may have a higher coupling loss and a small alignment tolerance when coupled with a single mode fiber.

A low loss polymer converter was also developed. The polymer converter may have a polymer core covering a silicon nano-scale tip. The polymer converter may have a low loss of about 0.8 dB when coupled with an optical fiber. However, the process for manufacturing the polymer converter may not be compatible with complementary metal-oxide-semiconductor (CMOS) technology. The same polymer converter was then fabricated using silicon oxynitride (SiON) as the cladding waveguide. However, the coupling loss for this polymer converter may be high, for example about 2.5 dB.

A vertical grating coupler can be used for coupling the waveguide and the optical fiber. Generally, the vertical grating coupler has a good alignment tolerance. However, the vertical grating coupler may be dependent on wavelength, and the process for manufacturing the vertical grating coupler may be difficult to control.

SUMMARY

According to one embodiment of the present invention, an optical converter is provided. The optical converter may include a signal receiving portion configured to receive an optical signal from an optical fiber which can be coupled to the optical converter, a signal output portion configured to output the optical signal received by the signal receiving portion, and a signal coupling portion being disposed between the signal receiving portion and the signal output portion and being configured to couple the optical signal received by the signal receiving portion into the signal output portion. The signal output portion may include a waveguide element having at least one tapered end section, and being partially or wholly surrounded by the signal coupling portion. The at least one tapered end section may be configured to couple the optical signal from the signal coupling portion into the waveguide element and the waveguide element may be configured to output the optical signal.

According to another embodiment of the present invention, a method of forming an optical converter as described may be provided. The method may include forming a signal output portion; and forming a waveguide structure which at least partially surrounds the signal output portion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Embodiments of an optical converter and a method of manufacturing the optical converter will be described in detail below with reference to the accompanying figures. It will be appreciated that the embodiments described below can be modified in various aspects without changing the essence of the invention.

Figure 1:
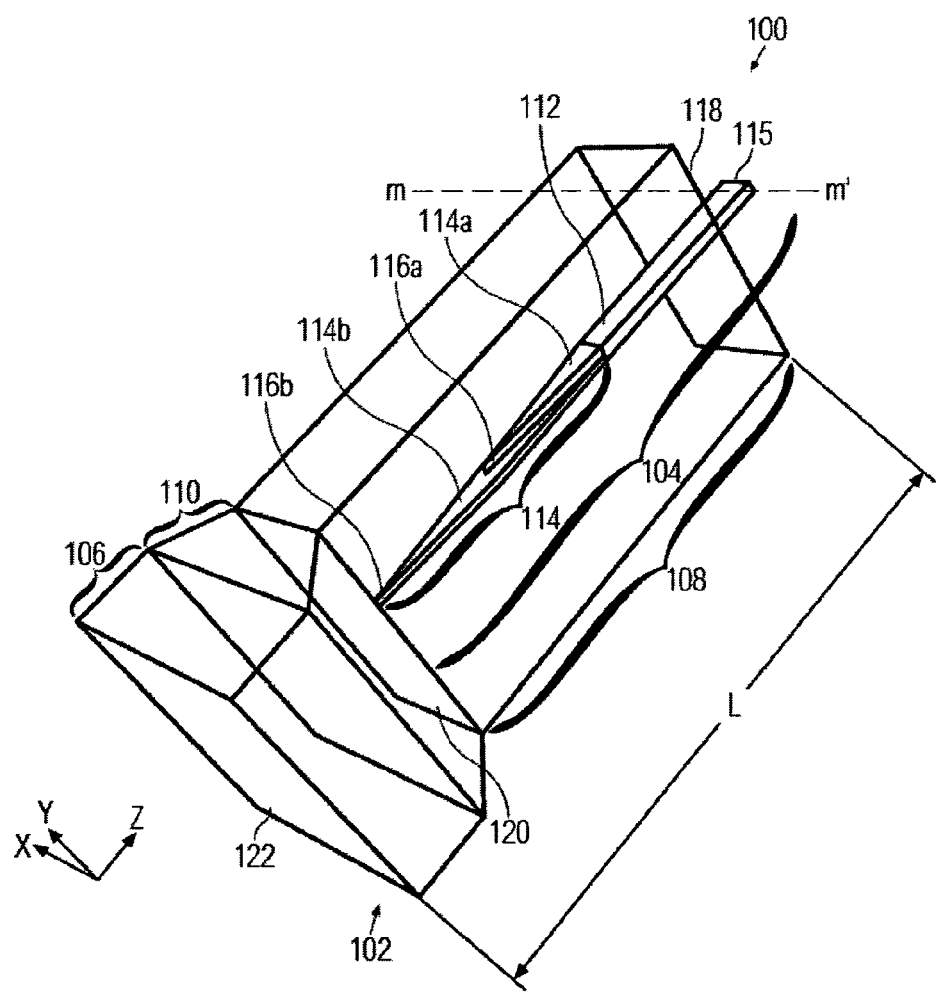
FIG. 1 shows a schematic three-dimensional view of an optical converter according to one embodiment of the present invention.

FIG. 1 shows a schematic three-dimensional view of an optical converter 100. The optical converter 100 may include a waveguide structure 102. The waveguide structure 102 may include a signal receiving portion 106 and a signal coupling portion 108. The waveguide structure 102 may include a joining portion 110 disposed between the signal receiving portion 106 and the signal coupling portion 108. The joining portion 110 may be configured to couple the signal receiving portion 106 and the signal coupling portion 108.

The signal receiving portion 106 and the signal coupling portion 108 may have different cross-sectional sizes and dimensions (shapes) in terms of e.g. length, width, height and diameter. In one embodiment, the signal receiving portion 106 may have a larger cross-sectional size and dimensions than the signal coupling portion 108. The signal receiving portion 106 may have a larger cross-sectional size and dimensions for coupling with an optical fibre and for matching the big mode size of e.g. a cleaved fibre. For example, the signal receiving portion 106 may have a width of about 9 μm, and the signal coupling portion 108 may have a width of about 2 μm. The joining portion 110 may taper from the signal receiving portion 106 towards the signal coupling portion 108 to couple the signal receiving portion 106 and the signal coupling portion 108. The length (L) of the waveguide structure 102 may be about 200 μm. The cross-sectional sizes and dimensions of the waveguide structure 102, the signal receiving portion 106, the signal coupling portion 108 and the joining portion 110 may be different in other embodiments.

The waveguide structure 102 of the optical converter 100 may be made of materials including but are not limited to silicon dioxide. Optical fibres are usually made of silicon dioxide or materials including silicon dioxide. Using e.g. silicon dioxide for the waveguide structure 102 may provide the waveguide structure 102 with a similar refractive index as the optical fibres. Therefore, transmission of an optical signal may be improved and transmission loss of an optical signal propagating from an optical fibre to the optical converter 100 may be reduced.

Figure 2:
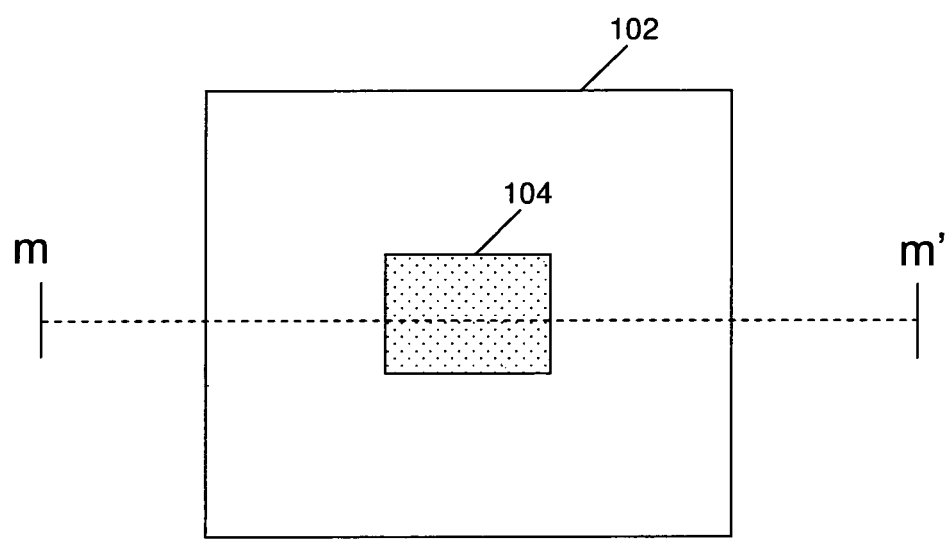
FIG. 2 shows a schematic cross sectional view of a waveguide structure usable within an optical converter according to one embodiment of the present invention.

The optical converter 100 may further include a signal output portion 104. The signal output portion 104 may be disposed in the waveguide structure 102. For example, the signal output portion 104 may be disposed in the signal coupling portion 108 of the waveguide structure 102. The signal output portion 104 may be disposed at a centre or at a near centre position of the cross section of the waveguide structure 102 taken along line m-m', as shown in FIG. 2. With such an arrangement, a coupling efficiency from the waveguide structure 102 to the signal output portion 104 may be improved. The signal output portion 104 may be made of materials including but are not limited to silicon.

The signal output portion 104 may include a waveguide element 112 having at least one tapered end section 114. The waveguide element 112 may extend beyond an end 118 of the signal coupling portion 108. Therefore, an end 115 of the waveguide element 112 may protrude the end 118 of the signal coupling portion 108. Thus, the signal output portion 104 may be partially or wholly surrounded by the signal coupling portion 108 of the waveguide structure 102. The waveguide element 112 of the signal output portion 104 may be at least partially surrounded by the signal coupling portion 108.

In one embodiment, the waveguide element 112 may have more than one tapered end section 114, e.g. a first tapered end section 114a and a second tapered end section 114b. An end 116a of the first tapered end section 114a and an end 116b of the second tapered end section 114b may face the joining portion 110 of the waveguide structure 102, and may face away from the end 118 of the signal coupling portion 108 of the waveguide structure 102. A distance between the end 116a of the first tapered end section 114a and the joining portion 110 may be larger than the end 116b of the second tapered end section 114b and the joining portion 110. The distance between the end 116b of the second tapered end section 114b and an end 120 of the joining portion 110 (i.e. the end 120 of the joining portion 110 which is coupled to the signal coupling portion 108) may be about 5 μm or more. The distance between the end 116b of the second tapered end section 114b and the end 120 of the joining portion 110 may be different in other embodiments.

The first tapered end section 114a and the second tapered end section 114b may have the same length and width. The first tapered end section 114a and the second tapered end section 114b may have different thickness. The first tapered end section 114a may have a thickness of about 140 nm. The second tapered end section 114b may have a thickness of about 80 nm. The waveguide element 112 may have a thickness of about 220 nm and a length of about 500 nm. The sizes and dimensions of the waveguide element 112 and the tapered end section 114 (e.g. the first tapered end section 114a and the second tapered end section 114b) may be different in other embodiments.

Figure 3A:
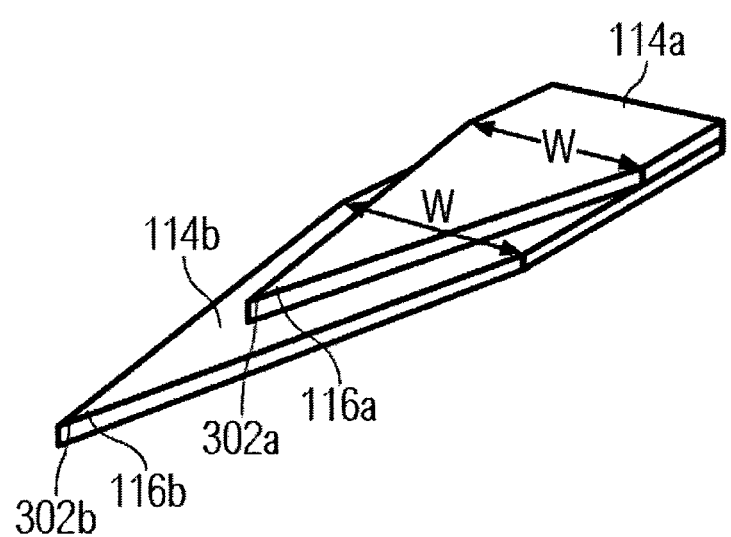
FIG. 3a shows a schematic three-dimensional view of a first tapered end section and a second tapered end section usable within an optical converter according to one embodiment of the present invention.
Figure 3B:
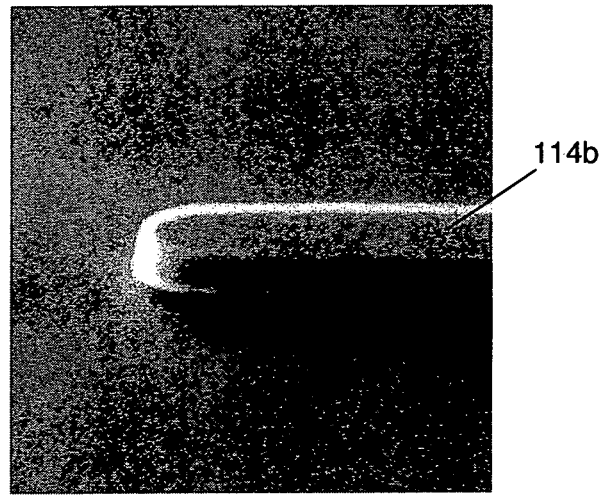
FIG. 3b shows a scanning electron microscopy image of a second tapered end section usable within an optical converter according to one embodiment of the present invention.
Figure 3C:
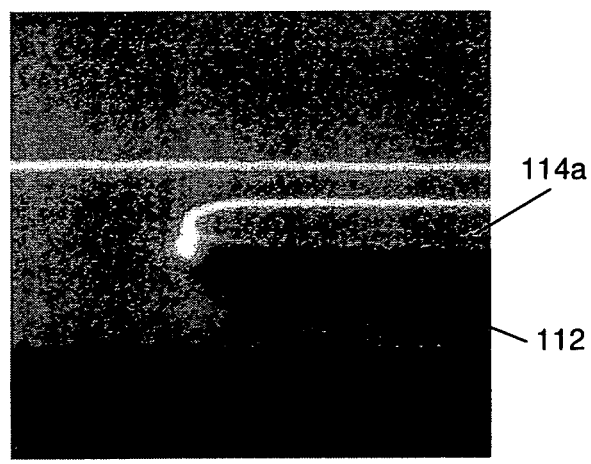
FIG. 3c shows a scanning electron microscopy image of a first tapered end section disposed above a waveguide element usable within an optical converter according to one embodiment of the present invention.

FIG. 3a shows a three-dimensional view of the first tapered end section 114a and the second tapered end section 114b. FIG. 3b shows a scanning electron microscopy (SEM) image of the second tapered end section 114b. FIG. 3c shows a SEM image of the first tapered end section 114a disposed above the waveguide element 112. As shown in FIG. 3a, the first tapered end section 114a may be arranged above the second tapered end section 114b. The first tapered end section 114a may overlap the second tapered end section 114b. The end 116a of the first tapered end section 114a may be displaced from the end 116b of the second tapered end section 114b. Other arrangements of the first tapered end section 114a and the second tapered end section 114b may be possible in other embodiments.

Both the first tapered end section 114a and the second tapered end section 114b may provide a tip 302a and 302b at the respective ends 116a and 116b. In other embodiments, the first tapered end section 114a and the second tapered end section 114b may provide different types and/or shapes of tapered ends. The first tapered end section 114a and the second tapered end section 114b may have a maximum width (w) of about 150 nm. The maximum width (w) of the first tapered end section 114a and the second tapered end section 114b may vary in different embodiments.

Details of transmission of an optical signal are described in the following.

Referring to FIG. 1, an optical fiber (not shown) may be coupled to the waveguide structure 102 of the optical converter 100. The optical fiber may be coupled to an end 122 of the signal receiving portion 106 facing away from the joining portion 110. The signal receiving portion 106 may receive an optical signal from the optical fiber via the end 122. The optical signal may be propagated from the signal receiving portion 106 into the joining portion 110. A mode size of the optical signal may be laterally compressed in the joining portion 110. The mode size of the optical signal may be compressed if the joining portion 110 is tapered from the signal receiving portion 106 towards the signal coupling portion 108. The signal mode size of the optical signal may be compressed to match the small mode size of the tapered end section 114. The joining portion 110 may couple the optical signal from the signal receiving portion 106 into the signal coupling portion 108. Thus, the optical signal may propagate from the joining portion 110 into the signal coupling portion 108. The signal coupling portion 108 may couple the optical signal into the signal output portion 104. The optical signal may propagate into the tapered end section 114 of the signal output portion 104. The tapered end section 114 may couple the optical signal into the waveguide element 112. The optical signal may propagate from the tapered end section 114 into the waveguide element 112. The waveguide element 112 may then output the optical signal.

Figure 4A:
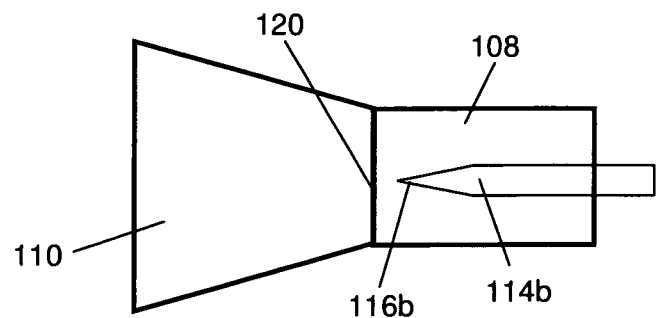
FIGS. 4a to 4c show schematic diagrams of different arrangements of a second tapered end section usable within an optical converter according to one embodiment of the present invention.

In one embodiment, as shown in FIG. 4a, the end 116b of the second tapered end section 114b may be disposed in the signal coupling portion. There may be a distance between the end 116b of the second tapered end section 114b and the end 120 of the joining portion 110. In such a configuration, the optical signal may be coupled into the second tapered end section 114b straight after the optical signal is coupled into the signal coupling portion 108.

Figure 4B:
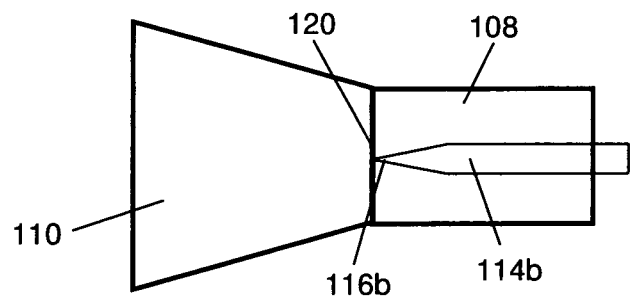

In another embodiment, as shown in FIG. 4b, the end 116b of the second tapered end section 114b may be in contact with the end 120 of the joining portion 110. In such a configuration, the optical signal may be coupled into the signal coupling portion 108 and the second tapered end section 114b at the same time.

Figure 4C:
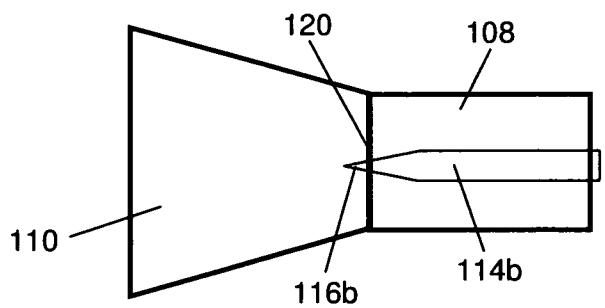

In yet another embodiment, as shown in FIG. 4c, the end 116b of the second tapered end section 114b may be disposed in the joining portion 110. In such a configuration, the optical signal may be coupled into the second tapered end section 114b which is disposed in the joining portion 110. Little optical signal may propagate into the signal coupling portion 108.

Figure 5:
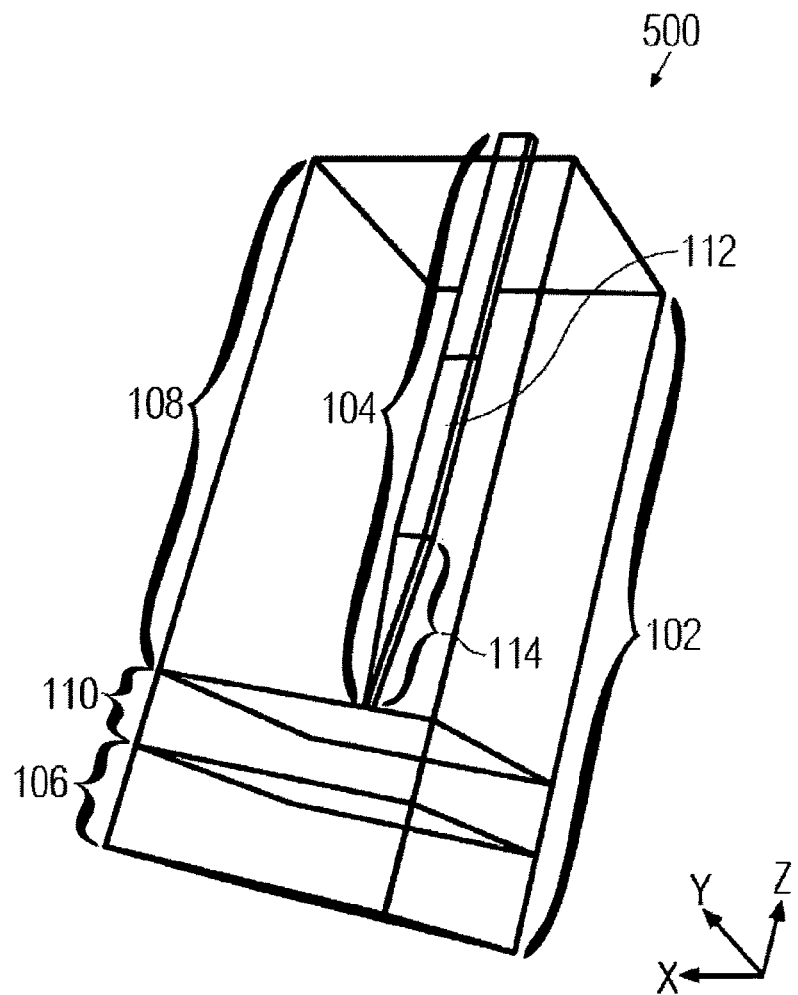
FIG. 5 shows a schematic three-dimensional view of another optical converter according to one embodiment of the present invention.

FIG. 5 shows a schematic three-dimensional view of another embodiment of the optical converter 500. In this embodiment, the waveguide structure 102 of the optical converter 500 may differ from the waveguide structure 102 of the optical converter 100 in that the signal receiving portion 106 and the signal coupling portion 108 have the same cross-sectional size. More particularly, the signal receiving portion 106 and the signal coupling portion 108 may have the same dimensions along x-axis and y-axis. Therefore, the joining portion 110 may have the same dimensions along the x-axis and the y-axis as the signal receiving portion 106 and the signal coupling portion 108. In short, the waveguide structure 102 of the optical converter 500 may have a constant cross-sectional size.

The signal output portion 104 of the optical converter 500 may differ from the signal output portion 104 of the optical converter 100 in that the waveguide element 112 has only one tapered end section 114. The number of tapered end sections 114 may be different in other embodiments of the optical converter 500.

Figure 6:
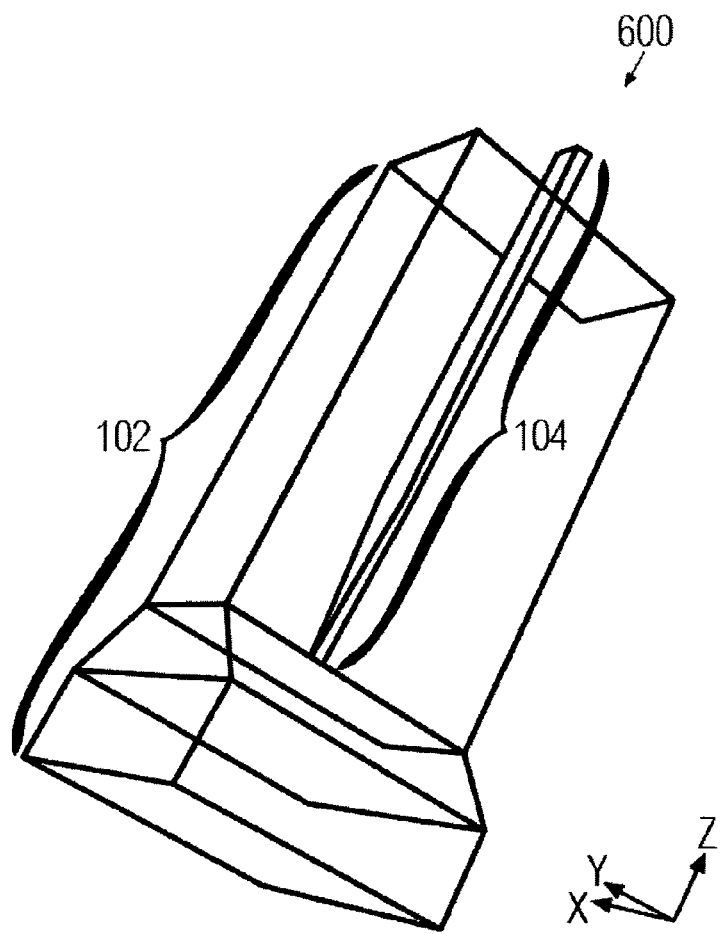
FIG. 6 shows a schematic three-dimensional view of yet another optical converter according to one embodiment of the present invention.

FIG. 6 shows a schematic three-dimensional view of yet another embodiment of the optical converter 600. In this embodiment, the waveguide structure 102 of the optical converter 600 may have a same configuration as the waveguide structure 102 of the optical converter 100. The signal output portion 104 of the optical converter 600 may have a same configuration as the signal output portion 104 of the optical converter 500.

Figure 7:
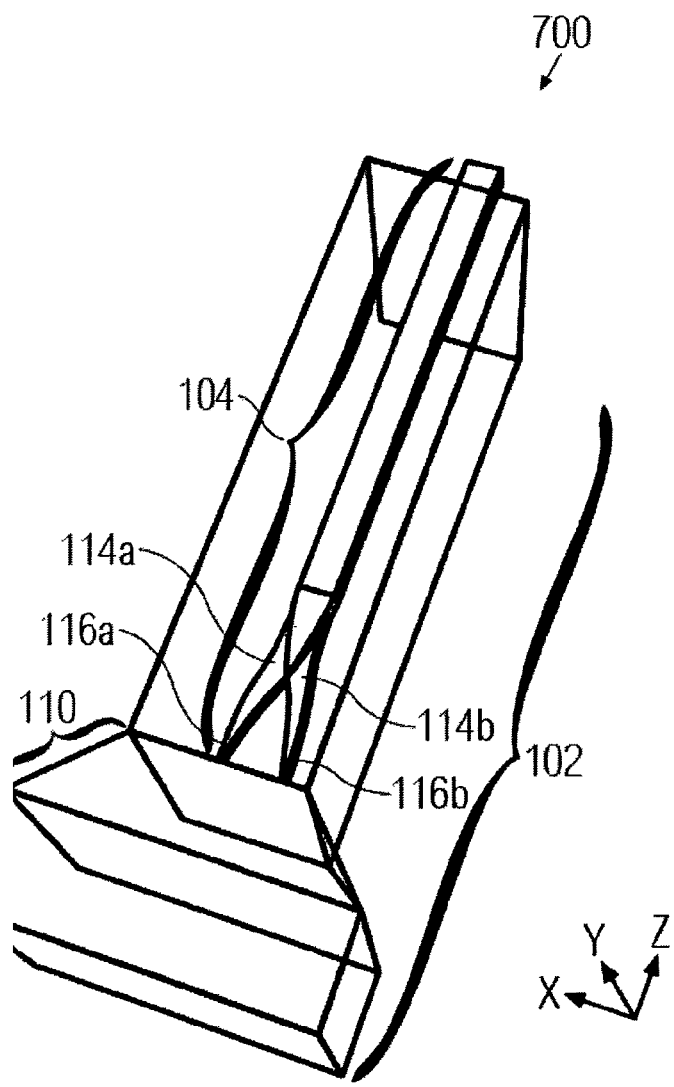
FIG. 7 shows a schematic three-dimensional view of yet another optical converter according to one embodiment of the present invention.

FIG. 7 shows a schematic three-dimensional view of yet another embodiment of the optical converter 700. In this embodiment, the waveguide structure 102 of the optical converter 700 may have a same configuration as the waveguide structure 102 of the optical converter 100. The signal output portion 104 of the optical converter 700 may differ from the signal output portion 104 of the optical converter 100 in the arrangement of the first tapered end section 114a and the second tapered end section 114b. The first tapered end section 114a may be adjacent to and spaced apart from the second tapered end section 114b. The distance between the end 116a of the first tapered end section 114a and the joining portion 110 and the distance between the end 116b of the second tapered end section 114b and the joining portion 110 may be the same.

Figure 8:
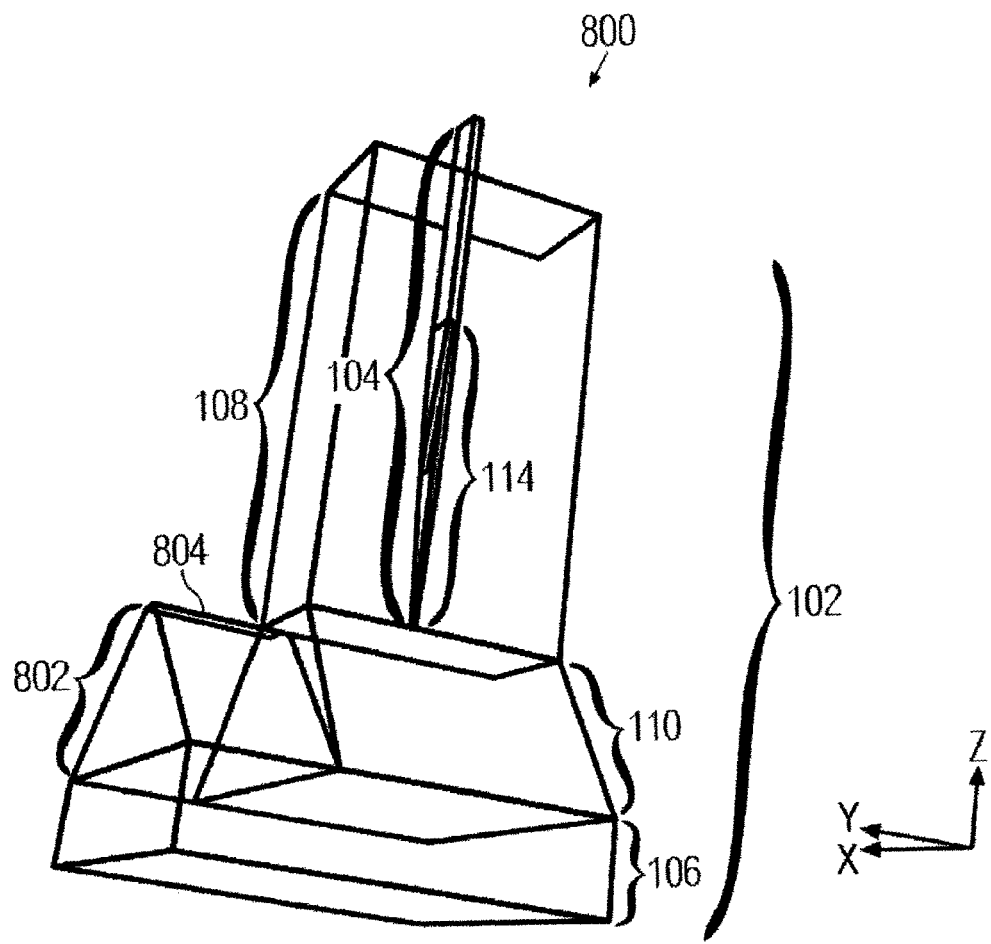
FIG. 8 shows a schematic three-dimensional view of yet another optical converter according to one embodiment of the present invention.

FIG. 8 shows a schematic three-dimensional view of yet another embodiment of the optical converter 800. The signal output portion 104 of the optical converter 800 may have a same configuration as the signal output portion 104 of the optical converter 100. The optical converter 800 may differ from the optical converter 100 in that the signal receiving portion 106 of the optical converter 800 may have a larger cross-sectional size than the signal receiving portion 106 of the optical converter 100. Therefore, the signal receiving portion 106 of the optical converter 800 may have a larger cross-sectional size than the joining portion 110 and the signal coupling portion 108 of the optical converter 800. Due to the larger cross-sectional size of the signal receiving portion 106, the optical converter 800 may have at least one further joining portion 802 arranged on the joining portion 110. For illustration purposes, only one further joining portion 802 is shown in FIG. 8. Arranging at least one further joining portion 802 on the joining portion 110 may vertically compress the optical signal to a smaller mode size which matches with the mode size of e.g. the tapered end section 114. A size of a tip 804 of the further joining portion 802 may affect the vertical compression of the optical signal. If the mode size of the tip 804 of the further joining portion 802 is smaller than the mode size of the optical signal, the optical signal may be blocked to propagate at the tip 804. The optical signal may then be vertically compressed into the joining portion 110. Therefore, a smaller tip 804 of the further joining portion 802 may be desired. In another embodiment, the optical converter 800 may have a further waveguide structure 102 arranged on the waveguide structure 102.

Figure 9A:
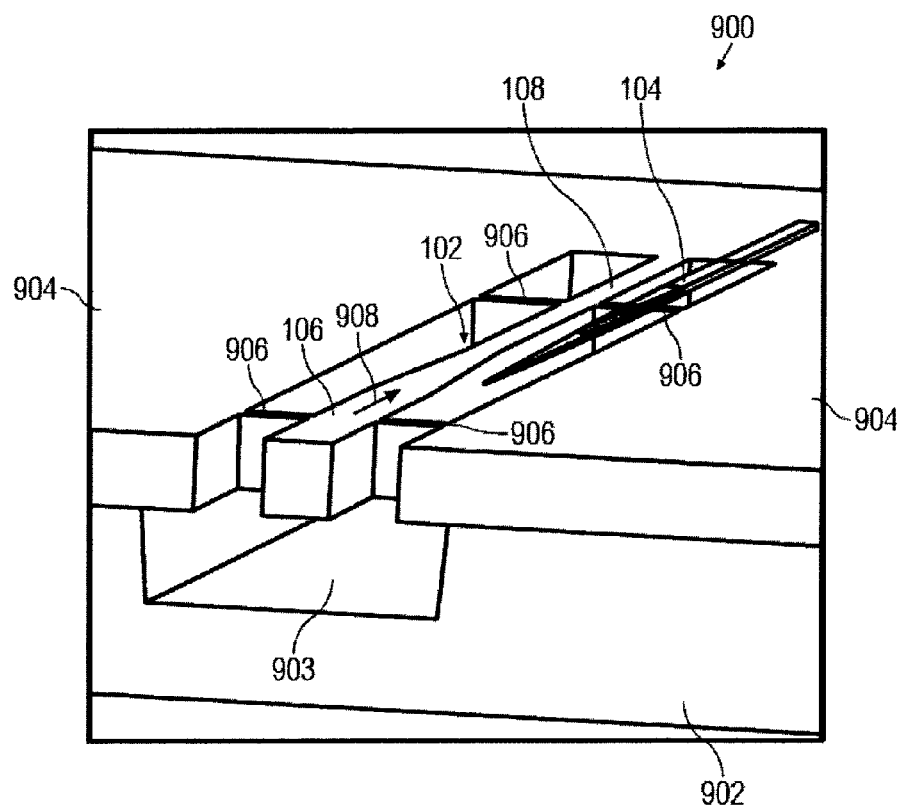
FIGS. 9a and 9b show schematic diagrams of a semiconductor package including the optical converter of FIG. 1 according to one embodiment of the present invention.
Figure 9B:
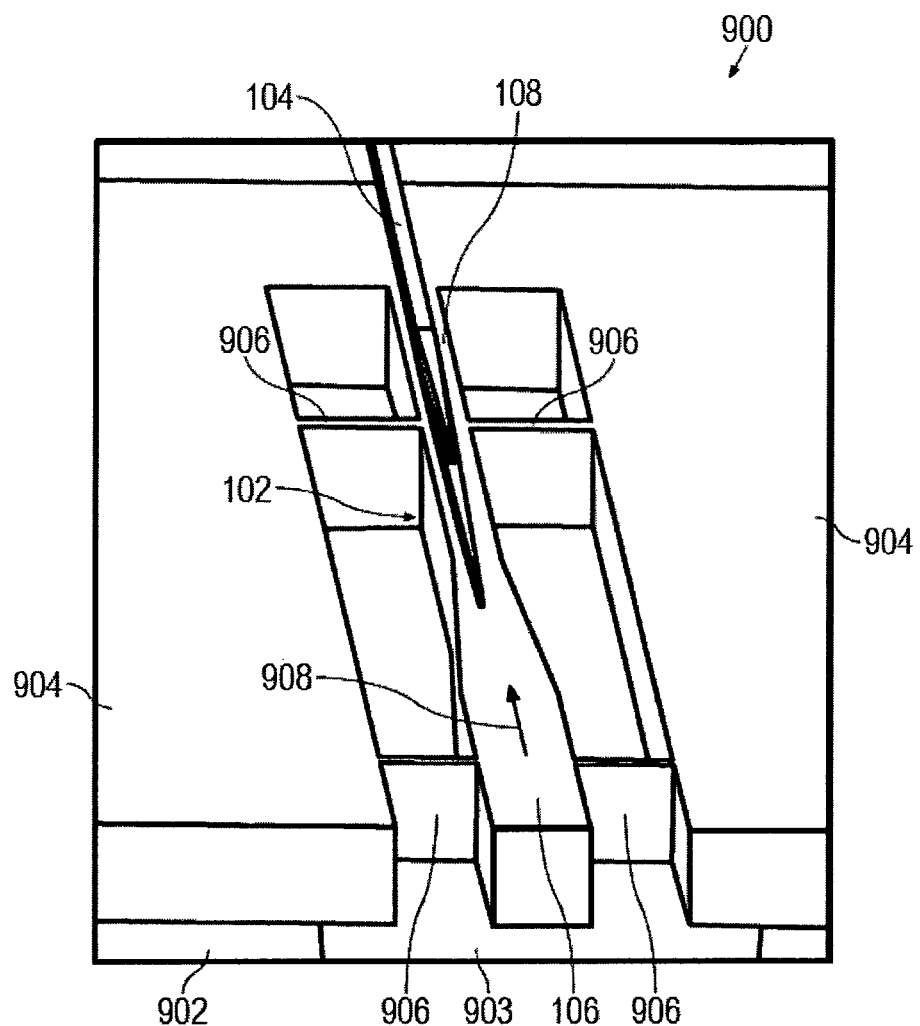

FIGS. 9a and 9b show schematic three-dimensional view of a semiconductor package 900 including the optical converter 100 of FIG. 1. The optical converter 100 may be formed such that the waveguide structure 102 is suspended above a wafer 902 or a substrate 902. It is understood by a skilled person that a waveguide typically has a cladding structure (e.g. two cladding layers) with a lower refractive index, and a core structure with a higher refractive index disposed between the two cladding layers. Since the waveguide structure 102 of the optical converter 100 is suspended above the wafer/substrate 902, it may be understood by a skilled person that the cladding of the waveguide structure 102 is air. It may also be understood by a skilled person that the parts of the waveguide structure 102 surrounding the tapered end section 114 and the waveguide element 112 may serve as cladding layers for the tapered end section 114 and the waveguide element 112. That is, the parts of the waveguide structure 102 surrounding the signal output portion 104 may serve as a cladding structure of the signal output portion 104 ("core structure"). In this embodiment, the refractive index of air ("first cladding") may be lower than the refractive index of the waveguide structure 102. The refractive index of the parts of the waveguide structure 102 ("second cladding") surrounding the signal output portion 104 may be lower than the refractive index of the signal output portion 104, i.e. of the tapered end section 114 and the waveguide element 112.

A trench structure 903 may be formed between the waveguide structure 102 and the wafer/substrate 902. The waveguide structure 102 and the wafer/substrate 902 may be spaced apart for more than about 2 μm. The waveguide structure 102 may be disposed between two layers 904 having a same material as the waveguide structure 102. The waveguide structure 102 may be spaced apart from the two adjacent layers of e.g. silicon dioxide 904 for about 2 μm or more. The waveguide structure 102 may be spaced apart from the adjacent layers of silicon dioxide 904 to prevent an optical signal from leaking into the adjacent layers of silicon dioxide 904. Further, the waveguide structure 102 may be spaced apart from the wafer/substrate 902 and the adjacent layers of silicon dioxide 904 to achieve a stable transmission of an optical signal with low loss.

Figure 10A:
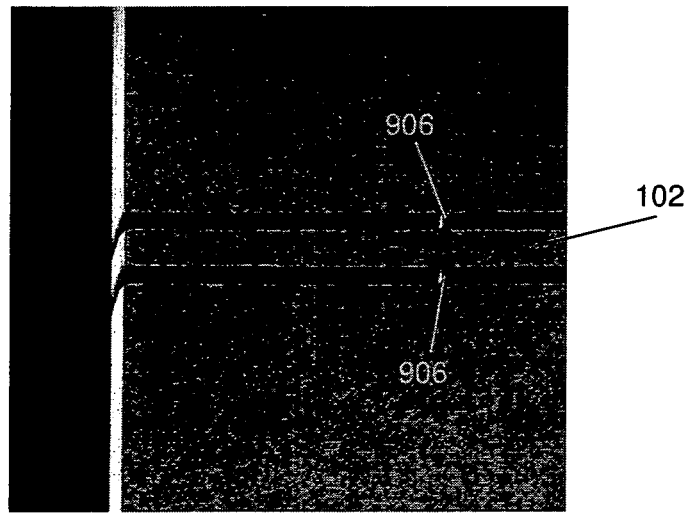
FIGS. 10a and 10b show scanning electron microscopy images of an optical converter with the support beams according to one embodiment of the present invention.
Figure 10B:
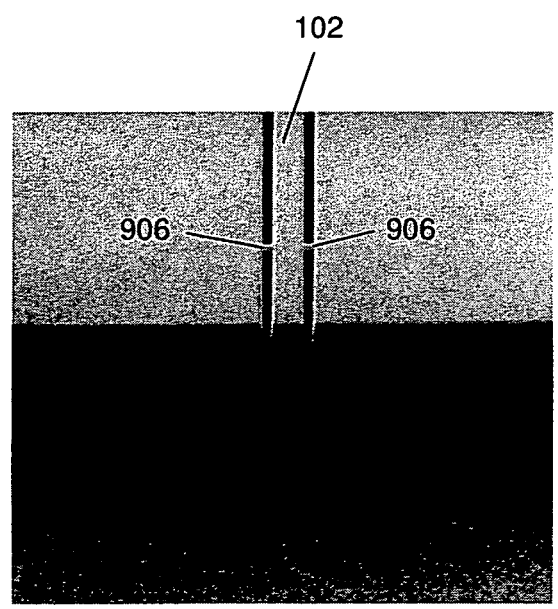

The waveguide structure 102 may be supported by a plurality of support beams 906. The plurality of support beams 906 may be disposed between the waveguide structure 102 and the two layers of silicon dioxide 904. The plurality of support beams 906 may provide structural strength for the waveguide structure 102. FIGS. 10a and 10b show SEM images of the waveguide structure 102 with the support beams 906. In one embodiment, as shown in FIGS. 10a and 10b, the waveguide structure 102 may be supported by e.g. two pairs of support beams 906. One pair of support beams 906 may disposed between the signal receiving portion 106 of the waveguide structure 102 and the adjacent layers of silicon dioxide 904, and another pair of support beams 906 may disposed between the signal coupling portion 108 of the waveguide structure 102 and the adjacent layers of silicon dioxide 904. The material of the support beams 906 may be the same as the material of the waveguide structure 102 and the material of the two adjacent layers 902. Therefore, the waveguide structure 102, the two adjacent layers 902 and the support beams 906 may be parts of a planar layer having a constant thickness. Different numbers of support beams 906 may be used in other embodiments. The arrangement of the support beams 906 may vary in different embodiments.

Each support beam 906 may have a thickness of about 1 μm along a direction of the optical signal transmission indicated by arrow 908. The support beams 906 may have different thickness in different embodiments. The thickness of the support beams 906 may affect optical loss. Therefore, the thickness of the support beams 906 may be selected to avoid increasing the optical loss.

Figure 11:
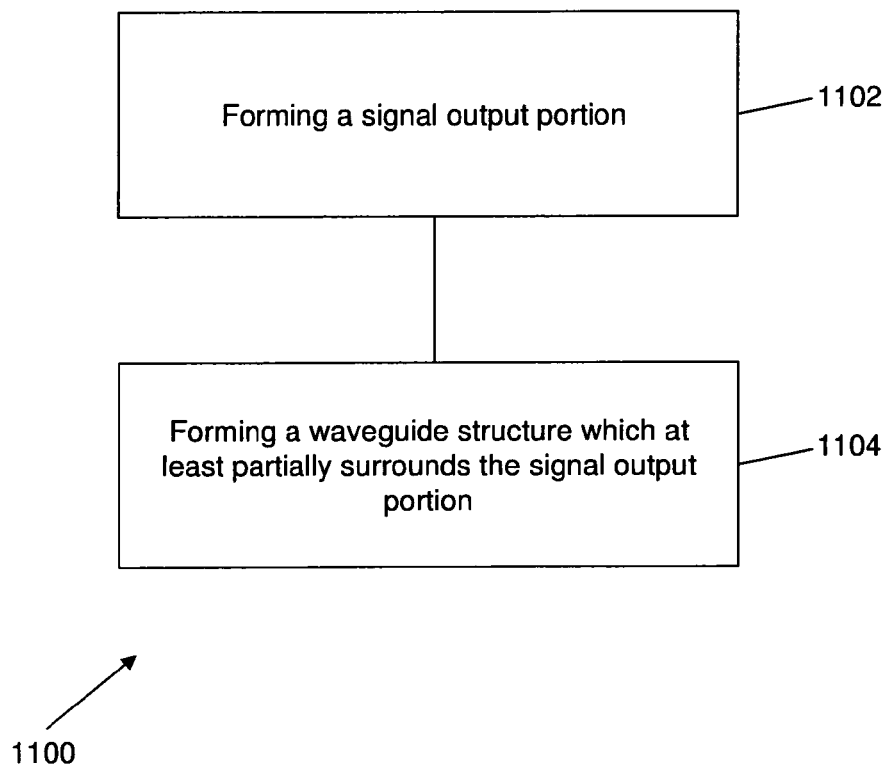
FIG. 11 shows a flowchart of a method of manufacturing an optical converter according to one embodiment of the present invention.

FIG. 11 shows a flowchart 1100 of a method of manufacturing an optical converter as described above. At 1102, a signal output portion may be formed. At 1104, a waveguide structure which at least partially surrounds the signal output portion may be formed.

Figure 12:
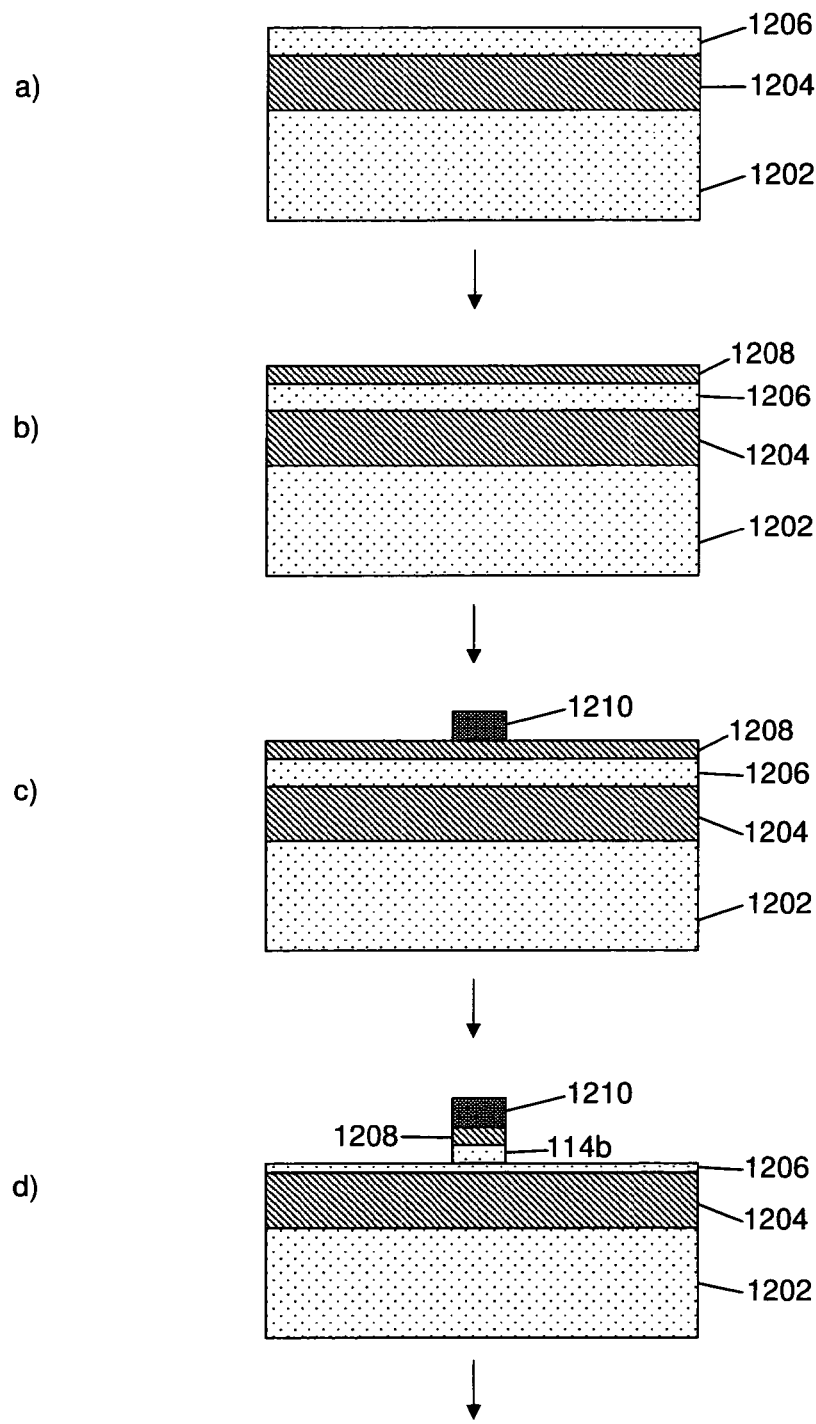
FIG. 12 shows processing stages of a method of manufacturing an optical converter according to one embodiment of the present invention.
Figure 12:
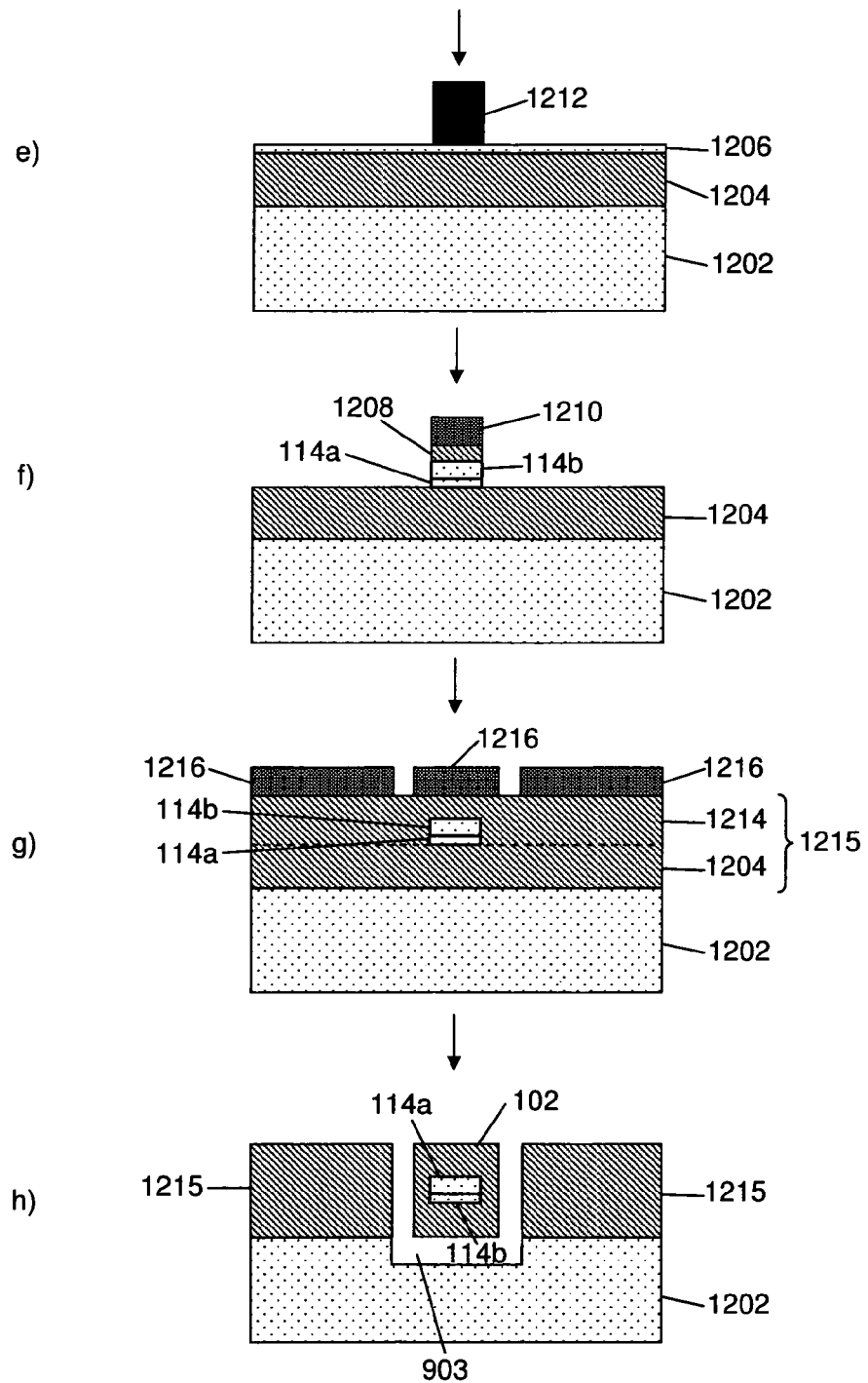

FIG. 12 shows processing stages of a method of manufacturing the optical converter 100 of FIG. 1. FIG. 12a shows that a silicon wafer layer 1202 is provided. The silicon wafer layer 1202 may have a diameter of about 200 mm. A first layer of silicon dioxide 1204 may be formed above the silicon wafer layer 1202. The first layer of silicon dioxide 1204 may form a layer of buried oxide. The first layer of silicon dioxide 1204 may have a thickness of about 2 μm. A layer of silicon 1206 may be formed above the first layer of silicon dioxide 1204. The layer of silicon 1206 may have a thickness of about 220 nm.

FIG. 12b shows a second layer of silicon dioxide 1208 formed above the layer of silicon 1206. The second layer of silicon dioxide 1208 may be formed by plasma-enhanced chemical vapour deposition. The second layer of silicon dioxide 1208 may have a thickness of about 100 nm. The second layer of silicon dioxide 1208 may be used as a hard mask.

FIG. 12c shows a first etching mask 1210 formed above the first layer of silicon dioxide 1208. A shape and size of the waveguide element 112 and the first tapered end section 114a may be patterned by 248 nm deep UV lithography.

FIG. 12d shows that the second layer of silicon dioxide 1208 is etched. The second layer of silicon dioxide 1208 may be etched by carbon tetraflouride. The layer of silicon 1206 may be partially etched to form a first tapered end section 114a. The layer of silicon 1206 may be partially etched by chlorine.

FIG. 12e shows that the first etching mask 1210, the etched second layer of silicon dioxide 1208 and the partially etched layer of silicon 1206 are covered with a second etching mask 1212. The second etching mask 1212 may include but is not limited to photoresist. FIG. 12f shows that the remaining layer of silicon 1206 is etched to form a second tapered end section 114b. The remaining layer of silicon 1206 may be etched by chlorine. The second etching mask 1212 may be removed. A waveguide element 112 (not shown) having the first tapered end section 114a and the second tapered end section 114b is formed. In short, the signal output portion 104 of the optical converter 100 is formed.

FIG. 12g shows a third layer of silicon dioxide 1214 formed above the first layer of silicon dioxide 1204 to cover the signal output portion 104 (e.g. the waveguide element 112 having the first tapered end section 114a and the second tapered end section 114b). The third layer of silicon dioxide 1214 may be formed by plasma-enhanced chemical vapour deposition. The third layer of silicon dioxide 1214 may have a thickness of about 4 μm. The first etching mask 1210 may be removed before the third layer of silicon dioxide 1214 is formed. The second layer of silicon oxide 1208 may not be removed. The first layer of silicon dioxide 1304, the second layer of silicon oxide 1208 and the third layer of silicon dioxide 1214 may form one layer of silicon dioxide 1215. A third etching mask 1216 may be formed above the third layer of silicon dioxide 1214. The third etching mask 1216 may be used to pattern a shape and a size of the waveguide structure 102 of the optical converter 100 and the trench structure 903.

FIG. 12h shows that the layer of silicon dioxide 1215 is etched to form the waveguide structure 102 of the optical converter 100. The layer of silicon dioxide 1215 may be etched by octofluorocyclobutane. The silicon wafer layer 1202 may be etched. The silicon wafer layer 1202 may be etched (e.g. dry etched) by sulphur hexafluoride ($SF_6$). The silicon wafer layer 1202 may also be etched (e.g. wet etched) by potassium hydroxide (KOH) or tetramethylammonium hydroxide (TMAH). There may be little or negligible reaction of the layer of silicon dioxide 1215 with any one of sulphur hexafluoride, potassium hydroxide or tetramethylammonium hydroxide. By etching the layer of silicon dioxide 1215 and the silicon wafer layer 1202, the trench structure 903 may be formed. The trench structure 903 may be formed such that the trench structure 903 at least partially surrounds the waveguide structure 102, and that the waveguide structure 102 at least partially surrounds the waveguide element 112. The trench structure 903 may be formed such that the optical converter 100 is suspended above the silicon wafer layer 1202. The third etching mask 1216 used for etching the layer of silicon dioxide 1215 and the silicon wafer layer 1202 may be structured such that a plurality of support beams 906 (not shown) may remain between the waveguide structure 102 and the remaining parts of the layer of silicon dioxide 1215.

In one embodiment, the trench structure 903 may be used for alignment between an optical fiber and the optical converter 100, instead of being used for polishing the chip having the optical converter 100. The processed silicon wafer layer 1202 having the optical converter 100 may be diced for testing and checking of the performance of the optical converter 100.

The above described processes may be used for manufacturing the other embodiments of the optical converter as shown in FIGS. 5 to 8. The various processes may be modified accordingly to manufacture the different optical converters as shown in FIGS. 5 to 8.

The optical converter 100 can be used to align with optical fibers for packaging processes due to low loss and improved alignment tolerance. The optical converter 100 may provide high efficiency and good tolerance. The optical converter 100 may be wavelength independent. The optical converter 100 may be manufactured using a simple and low cost process which is easy to control.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An optical converter, comprising:
   a signal receiving portion configured to receive an optical signal from an optical fiber which can be coupled to the optical converter,
   a signal output portion configured to output the optical signal received by the signal receiving portion, and
   a signal coupling portion being disposed between the signal receiving portion and the signal output portion and being configured to couple the optical signal received by the signal receiving portion into the signal output portion,
   a joining portion being disposed between the signal receiving portion and the signal coupling portion and being configured to couple the optical signal from the signal receiving portion into the signal coupling portion;
   wherein the signal output portion comprises a waveguide element having at least one tapered end section, and being partially or wholly surrounded by the signal coupling portion;
   wherein the at least one tapered end section is configured to couple the optical signal from the signal coupling portion into the waveguide element and the waveguide element is configured to output the optical signal;
   wherein the signal receiving portion, the signal coupling portion and the joining portion respectively form a part of a waveguide structure;
   wherein the waveguide structure is arranged such that the waveguide structure is suspended above a substrate or a wafer;
   wherein the waveguide structure is disposed between two layers, wherein the material of the waveguide structure and the material of the two layers are the same;
   the optical converter further comprising a plurality of support beams disposed between the waveguide structure and the two respective layers, wherein the plurality of support beams are configured to couple the waveguide structure to the two layers, and wherein the material of the support beams is the same as that of the waveguide structure and the two layers.

2. The optical converter of claim 1, wherein the signal receiving portion and the signal coupling portion have the same cross-sectional size.

3. The optical converter of claim 1, wherein the signal receiving portion has a larger cross-sectional size than that of the signal coupling portion.

4. The optical converter of claim 3, wherein the joining portion tapers from the signal receiving portion towards the signal coupling portion.

5. The optical converter of claim 1, wherein the at least one tapered end section is facing the joining portion.

6. The optical converter of claim 1, wherein the waveguide element has a first tapered end section and a second tapered end section.

7. The optical converter of claim 6, wherein the first tapered end section is arranged on the second tapered end section such that a distance between the first tapered end section and the joining portion is larger than the distance between the second tapered end section and the joining portion.

8. The optical converter of claim 6, wherein the second tapered end section is in contact with an end of the joining portion which is coupled to the signal coupling portion.

9. The optical converter of claim 6, wherein the second tapered end section extends into the joining portion.

10. The optical converter of claim 9, wherein the joining portion is configured to couple the optical signal from the signal receiving portion into the second tapered end section.

11. The optical converter of claim 6, wherein the first tapered end section is adjacent to and spaced apart from the second tapered end section.

12. The optical converter of claim 11, wherein a distance between the first tapered end section and the joining portion and a distance between the second tapered end section and the joining portion are the same.

13. The optical converter of claim 3, further comprising a further joining portion arranged on the joining portion.

14. The optical converter of claim 1, wherein the waveguide structure, the two layers and the plurality of support beams are parts of a planar layer having a constant thickness.

15. A method of forming an optical converter according to claim 1, the method comprising:
   forming a signal output portion; and
   forming a waveguide structure which at least partially surrounds the signal output portion;
   wherein the waveguide structure is suspended above a silicon wafer layer.

16. The method of claim 15, wherein forming the signal output portion comprises:
   forming a first layer of silicon dioxide above the silicon wafer layer;
   forming a layer of silicon above the first layer of silicon dioxide;
   forming a second layer of silicon dioxide above the layer of silicon;
   forming a first etching mask above the second layer of silicon dioxide;
   etching the second layer of silicon dioxide;
   partially etching the layer of silicon to form a first tapered end section;
   covering the first etching mask, the etched second layer of silicon dioxide, the partially etched layer of silicon with a second etching mask; and etching the remaining layer of silicon to form a second tapered end section and a waveguide element of the signal output portion.

17. The method of claim 16, wherein forming the waveguide structure comprises:
   removing the second etching mask;
   removing the first etching mask;
   forming a third layer of silicon dioxide layer above the first layer of silicon dioxide layer to cover the waveguide element having the first tapered end section and the second tapered end section.

18. The method of claim 17, wherein forming the waveguide structure further comprises:
   forming a third etching mask above the third layer of silicon dioxide;
   etching a trench structure into the silicon wafer layer, the first layer of silicon dioxide and the third layer of silicon dioxide such that the trench structure at least partially surrounds the waveguide structure, and that the waveguide structure at least partially surrounds the waveguide element.

19. The method of claim 18, wherein the third etching mask used for etching the silicon wafer layer, the first layer of silicon dioxide and the third layer of silicon dioxide is structured such that a plurality of support beams of silicon dioxide remains between the waveguide structure and the remaining parts of the first layer of silicon dioxide and the third layer of silicon dioxide.

20. The method of claim 18, wherein the trench structure is etched such that the waveguide structure is suspended above the silicon wafer layer.

21. An optical converter comprising:
   a signal receiving portion configured to receive an optical signal from an optical fiber which can be coupled to the optical converter;
   a signal output portion configured to output the optical signal received by the signal receiving portion; and
   a signal coupling portion being disposed between the signal receiving portion and the signal output portion and being configured to couple the optical signal received by the signal receiving portion into the signal output portion;
   a joining portion being disposed between the signal receiving portion and the signal coupling portion and being configured to couple the optical signal from the signal receiving portion into the signal coupling portion;
   wherein the signal output portion comprises a waveguide element having at least one tapered end section, and being partially or wholly surrounded by the signal coupling portion;
   wherein the at least one tapered end section is configured to couple the optical signal from the signal coupling portion into the waveguide element and the waveguide element is configured to output the optical signal;
   wherein the signal receiving portion, the signal coupling portion and the joining portion respectively form a part of a waveguide structure;
   wherein the waveguide structure is arranged such that the waveguide structure is suspended above a substrate or a wafer with an air gap therebetween.

\* \* \* \* \*